(12) United States Patent
Lin et al.

(10) Patent No.: US 12,215,041 B2
(45) Date of Patent: Feb. 4, 2025

(54) WATER FILTER WITH QUICK RELEASE DEVICE

(71) Applicant: Kemflo International Co., Ltd., Pingtung (TW)

(72) Inventors: Sheng-Nan Lin, Pingtung (TW); Hao-Chan Wei, Pingtung (TW); Yi-Wen Liao, Pingtung (TW); Zhe-Hua Ou, Pingtung (TW)

(73) Assignee: Kemflo International Co., Ltd., Pingtung (TW)

( * ) Notice: Subject to any disclaimer, the term of this patent is extended or adjusted under 35 U.S.C. 154(b) by 443 days.

(21) Appl. No.: 17/874,387

(22) Filed: Jul. 27, 2022

(65) Prior Publication Data
US 2024/0034641 A1 Feb. 1, 2024

(51) Int. Cl.
*C02F 1/00* (2023.01)

(52) U.S. Cl.
CPC ........ *C02F 1/001* (2013.01); *C02F 2201/004* (2013.01); *C02F 2201/005* (2013.01); *C02F 2201/006* (2013.01)

(58) Field of Classification Search
CPC ................ C02F 1/001; C02F 2201/004; C02F 2201/006; C02F 2201/005; C02F 2307/06; C02F 1/003; B01D 2201/40; B01D 35/30; B01D 2313/21; B01D 2313/13

USPC ......................................... 210/234, 235, 236
See application file for complete search history.

(56) References Cited

U.S. PATENT DOCUMENTS

| | | | | |
|---|---|---|---|---|
| 7,651,070 | B2 * | 1/2010 | Ruprecht | B01D 35/30 210/420 |
| 9,044,699 | B2 * | 6/2015 | Gale | B01D 35/30 |
| 9,789,424 | B2 * | 10/2017 | Reckin | B01D 27/08 |
| 11,185,804 | B2 * | 11/2021 | Bassett | B01D 35/306 |
| 11,285,413 | B2 * | 3/2022 | Sun | B01D 35/30 |

\* cited by examiner

*Primary Examiner* — Terry K Cecil
(74) *Attorney, Agent, or Firm* — Chun-Ming Shih; LANWAY IPR SERVICES

(57) ABSTRACT

A water filter includes a filtering head, a filter bottle assembly, a switch member, and a quick release device. The filtering head includes a flow channel module. The filter bottle assembly includes a filter bottle. The quick release device includes a press lever, two links, and two push members. When the press lever is pivoted, the two links and the two push members are driven by the press lever to move the filter bottle simultaneously so that the filter bottle is mounted on or detached from the filtering head quickly. A switch member functions as a waterway switch to control a water supply of the filtering head and functions as a locking mechanism for locking or unlocking the quick release device.

10 Claims, 9 Drawing Sheets

WATER FILTER WITH QUICK RELEASE DEVICE

BACKGROUND OF THE INVENTION

1. Field of the Invention

The present invention relates to a water filter and, more particularly, to a water filter with a quick release device.

2. Description of the Related Art

A conventional water filter or purifier comprises a filtering head and a filter bottle. The filter bottle contains a filter element and is connected with the filtering head. When the user wishes to replace the filter element, the water source is shut, and the filter bottle is rotated by a wrench to detach the filter bottle from the filtering head. However, the water easily leaks outward during replacement of the filter element if the user forgets to shut the water source. In addition, the filter bottle easily falls down after being detached from the filtering head, thereby causing danger to the user. Another conventional water filter further comprises a cam sliding rail (or track) which is rotated to mount or detach the filter bottle. However, the cam sliding rail has a complicated structure and is exposed from the filtering head so that the cam sliding rail is easily hooked or torn by the user. In addition, the filter bottle easily falls down after being detached from the filtering head.

BRIEF SUMMARY OF THE INVENTION

In accordance with the present invention, there is provided a water filter comprising a filtering head, a filter bottle assembly, and a quick release device. The filtering head includes a flow channel module. The flow channel module includes a first flow channel, a second flow channel, and a water valve assembly. The water valve assembly is arranged between the first flow channel and the second flow channel. The filtering head has a lower end having two sides each provided with two opposite slideways. The filter bottle assembly includes a filter bottle. The filter bottle is removably connected with the filtering head and has a first fitting portion and a second fitting portion. The quick release device includes a press lever, two links, two push members, and two snap-fit members. The press lever is pivotally connected with the filtering head. The press lever is provided with two first connecting portions, two second connecting portions, and two positioning holes. The press lever has two opposite sides arranged symmetrically. The two first connecting portions, the two second connecting portions, and the two positioning holes are formed on the two opposite sides of the press lever. Each of the two push members has a first extension arm, a second extension arm, and two sliding tracks. Each of the two push members has a top provided with a receiving portion connecting the first extension arm and the second extension arm. Each of the two push members has a bottom provided with a slot penetrating the first extension arm and the second extension arm. The two sliding tracks of each of the two push members are slidably mounted in the two slideways of the filtering head. Each of the two snap-fit members is pivotally connected with the second extension arm of one of the two push members. Each of the two links has a first end portion pivotally connected with one of the two second connecting portions of the press lever. Each of the two links has a second end portion pivotally connected with the second extension arm of one of the two push members and connected with one of the two snap-fit members. the press lever, the two links, and the two push members of the quick release device are moved in concert, and the two snap-fit members are movably snapped onto the second fitting portion of the filter bottle. When the press lever is pivoted about the two first connecting portions, the two links, the two push members, and the two snap-fit members are driven by the press lever to move the filter bottle simultaneously. When the press lever is moved downward, the two links and the two push members are moved downward so that the filter bottle is moved downward and is unlocked from the filtering head. When the press lever is moved upward, the two links and the two push members are moved upward so that the filter bottle is moved upward and is locked onto the filtering head.

According to the primary advantage of the present invention, the quick release device is connected with the filtering head and the filter bottle. Thus, when the press lever of the quick release device is moved upward and downward, the two links and the two push members drive the filter bottle simultaneously which is moved upward and downward in a linear manner, so that the filter bottle is detached and assembled easily and quickly by operation of the quick release device.

According to another advantage of the present invention, a switch member is mounted on the filtering head. Thus, the switch member opens or closes the waterway of the flow channel module of the filtering head and locks or unlocks the quick release device simultaneously so that the quick release device is unlocked simultaneously when the water supply is turned off, to prevent the water from leaking outward during replacement of the filter element.

According to a further advantage of the present invention, a spring-biased push block is movably mounted in the filtering head, and a sliding button is movably mounted on the filtering head and connected with the spring-biased push block. When the sliding button is moved on the filtering head, the spring-biased push block is driven by the sliding button and moved relative to the filtering head. The spring-biased push block is locked in or detached from one of the two positioning holes of the press lever. Thus, the spring-biased push block provides a safety arrangement to restrict the quick release device.

According to a further advantage of the present invention, each of the two snap-fit members includes a pivot portion, a snap-fit portion, and a driving portion. The snap-fit portion has a locking recess locked on one of the two positioning bolts of the second fitting portion of the filter bottle. The driving portion is connected with a push button, and when the push button is pressed, each of the two snap-fit members is pivoted about the pivot portion, so that the snap-fit portion is detached from one of the two positioning bolts to unlock the filter bottle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
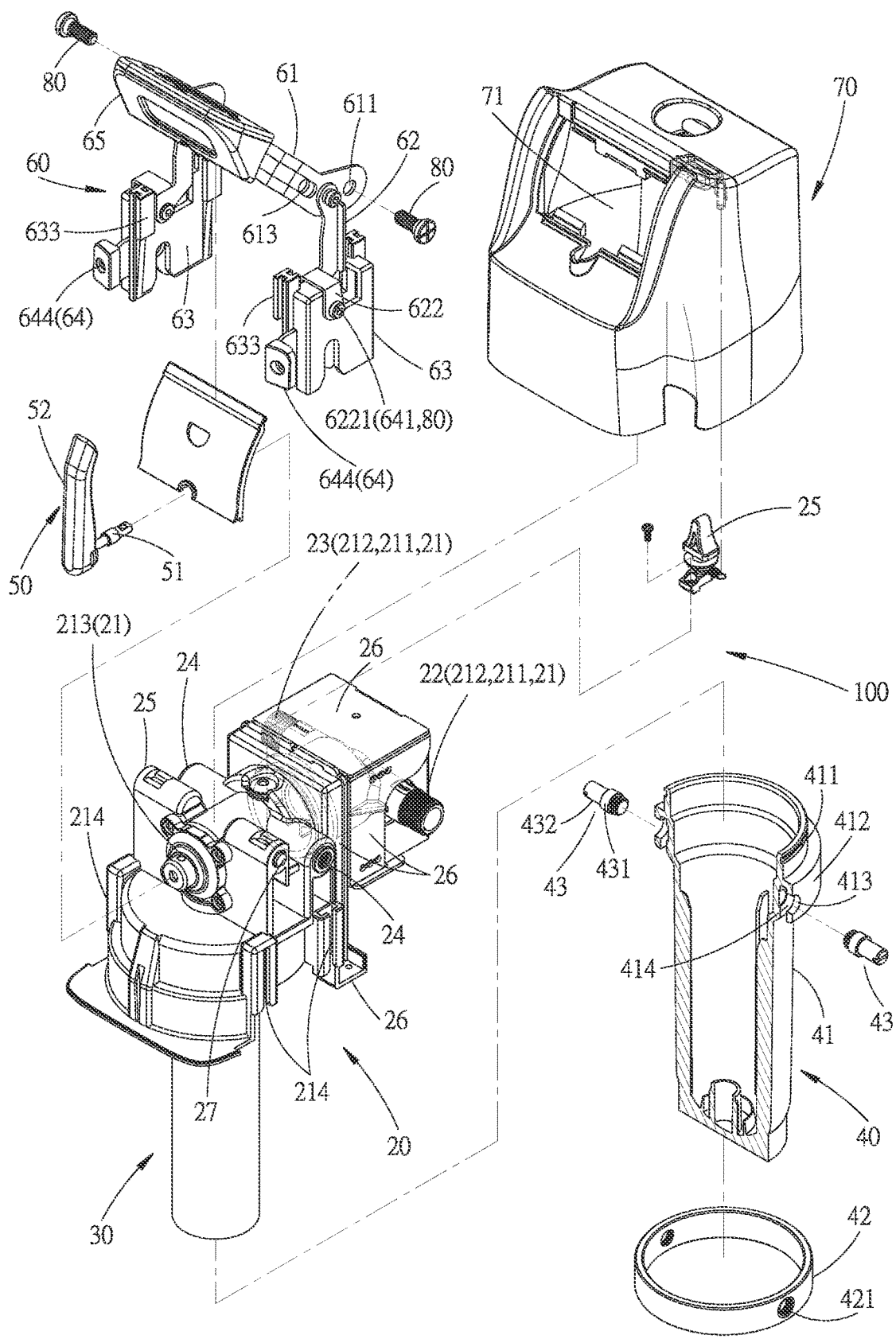
FIG. 1 is an exploded perspective view of a water filter in accordance with the preferred embodiment of the present invention.
Figure 2:
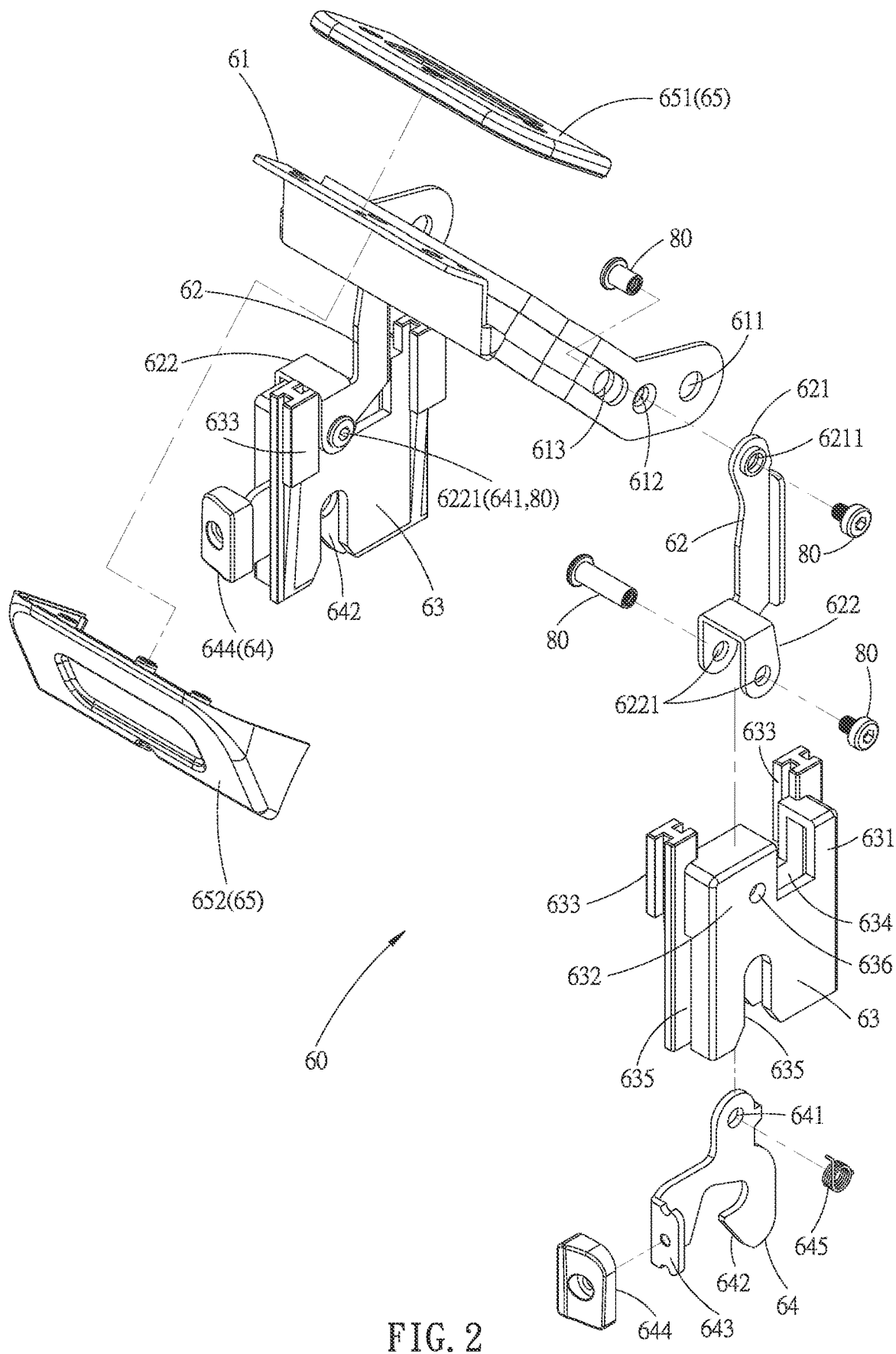
FIG. 2 is a locally enlarged exploded perspective view of a quick release device of the water filter in accordance with the preferred embodiment of the present invention.

Referring to the drawings and initially to FIGS. 1-7, a water filter 100 in accordance with the preferred embodiment of the present invention comprises a filtering head (or housing) 20, a filter element (or cartridge) 30, a filter bottle assembly 40, a switch member 50, a quick release device 60, and multiple fastening members 80.

The filtering head 20 includes a flow channel module 21, a water inlet 22, and a water outlet 23. The flow channel module 21 includes a first flow channel 211, a second flow channel 212, and a water valve assembly 213. The water valve assembly 213 is arranged between the first flow channel 211 and the second flow channel 212, and has a flow passage. The water valve assembly 213 is connected with the switch member 50.

In practice, when the water filter 100 is disposed at a first flow path mode (or water purifying mode), the flow passage of the water valve assembly 213 is connected to the first flow channel 211, so that water from the water inlet 22 in turn passes through the first flow channel 211, the water valve assembly 213, the filter element 30, and the second flow channel 212, and finally flows outward from the water outlet 23. Alternatively, when the water filter 100 is disposed at a second flow path mode (or replacement mode), the flow passage of the water valve assembly 213 is disconnected from the first flow channel 211, so that the water from the water inlet 22 directly passes through the first flow channel 211 and the second flow channel 212, and flows outward from the water outlet 23.

The filtering head 20 has an upper end provided with two opposite locking (or pivoting) portions 24. The filtering head 20 has a lower end having two sides each provided with two opposite slideways 214.

A spring-biased push block 27 is movably mounted in the filtering head 20. A sliding button 25 is movably mounted on the upper end of the filtering head 20 and connected with the spring-biased push block 27. When the sliding button 25 is moved on the filtering head 20 rightward or leftward, the spring-biased push block 27 is driven by the sliding button 25 and moved rightward or leftward relative to the filtering head 20.

A mounting bracket 26 is mounted on a rear side of the filtering head to attach the water filter 100 to a working place, such as a table or the like. A filter cap 70 is mounted on the filtering head 20 to cover and protect the filtering head 20. The filter cap 70 is hollow and has a front side provided with an opening 71.

The filter bottle assembly 40 includes a filter bottle (or container) 41, a retaining ring 42, and two positioning bolts 43.

The filter bottle 41 has an open top and has an interior provided with a receiving space for accommodating the filter element 30. The filter bottle 41 is removably connected with the filtering head 20 and has a periphery provided with a first fitting portion 411 and a second fitting portion 412. The first fitting portion 411 of the filter bottle 41 is assembled with the filtering head 20. The second fitting portion 412 of the filter bottle 41 is provided with two through holes 413 opposite to each other. The second fitting portion 412 of the filter bottle 41 has an interior provided with an insertion groove 414. The insertion groove 414 has an annular shape and is connected to the two through holes 413.

The retaining ring 42 is inserted into and mounted in the insertion groove 414 of the second fitting portion 412 of the filter bottle 41. The retaining ring 42 is provided with two locking holes 421 opposite to each other. Each of the two locking holes 421 is a screw hole.

Each of the two positioning bolts 43 is locked on the second fitting portion 412 of the filter bottle 41. Each of the two positioning bolts 43 is provided with a locking portion 431 and a protruding stub (or shaft) 432. The locking portion 431 of each of the two positioning bolts 43 is provided with an outer thread. The locking portion 431 of each of the two positioning bolts 43 extends through one of the two through holes 413 of the second fitting portion 412 of the filter bottle 41 and secured in one of the two locking holes 421 of the retaining ring 42, so that each of the two positioning bolts 43 is locked on the second fitting portion 412 of the filter bottle 41, and the retaining ring 42 is locked in the second fitting portion 412 of the filter bottle 41. The protruding stub 432 of each of the two positioning bolts 43 projects outward from the second fitting portion 412 of the filter bottle 41.

Thus, the retaining ring 42 and the two positioning bolts 43 are secured on the filter bottle 41 to form a reinforcing rib to enhance the strength of the filter bottle assembly 40.

The switch member 50 is connected with the flow channel module 21 of the filtering head 20 to construct a waterway switch. The switch member 50 has a first end provided with a control lever (or stick) 51 and a second end provided with a handle 52. The control lever 51 of the switch member 50 is connected with the water valve assembly 213 of the flow channel module 21 of the filtering head 20 to rotate and control the water valve assembly 213. The handle 52 of the switch member 50 is operated to control rotation of the switch member 50 so that the switch member 50 is moved between a first positioning angle X1 (see FIG. 4) and a second positioning angle X2 (see FIG. 8).

Figure 3:
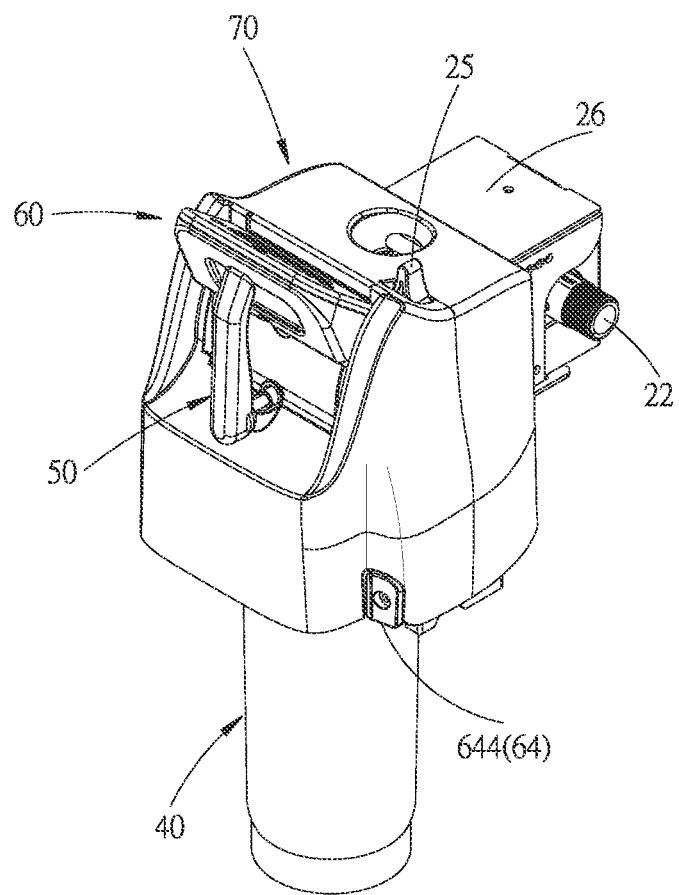
FIG. 3 is a perspective view of the water filter in accordance with the preferred embodiment of the present invention.

When the switch member 50 is moved to the first positioning angle X1, the water valve assembly 213 of the flow channel module 21 of the filtering head 20 is rotated by the control lever 51 of the switch member 50 so that the flow passage of the water valve assembly 213 is connected to the first flow channel 211, and the flow channel module 21 of the filtering head 20 is disposed at the first flow path mode (or water purifying mode). At this time, the handle 52 of the switch member 50 is situated at a vertical state (or high level) as shown in FIG. 3, and the quick release device 60 is locked by the handle 52 of the switch member 50 and cannot be moved.

When the switch member 50 is moved to the second positioning angle X2, the water valve assembly 213 of the flow channel module 21 of the filtering head 20 is rotated by the control lever 51 of the switch member 50 so that the flow passage of the water valve assembly 213 is disconnected from the first flow channel 211, and the flow channel module 21 of the filtering head 20 is disposed at the second flow path mode (or replacement mode). At this time, the handle 52 of the switch member 50 is situated at a horizontal state (or low level), and the quick release device 60 is unlocked from the handle 52 of the switch member 50 and can be moved freely.

In such a manner, the switch member 50 is designed to function as a waterway switch for the flow channel module 21 of the filtering head 20 and to function as a locking mechanism for locking or unlocking the quick release device 60. Thus, the switch member 50 is rotated by operation of the control lever 51 to switch the flow channel module 21 of the filtering head 20 between the first flow path mode (or water purifying mode) and the second flow path mode (or replacement mode), and to simultaneously switch the quick release device 60 between a locked state and an unlocked state.

The quick release device 60 includes a press lever (or piece) 61, two links 62, two push (or thrust) members 63, and two snap-fit members (or fastening latches) 64.

The press lever 61 is pivotally connected with the filtering head 20 and is limited by the handle 52 of the switch member 50. The press lever 61 is provided with two first connecting portions 611, two second connecting portions 612, and two positioning holes 613. Each of the two first connecting portions 611 of the press lever 61 is pivotally connected with one of the two locking portions 24 of the filtering head 20 by one of the fastening members 80. The spring-biased push block 27 is inserted into and locked in one of the two positioning holes 613 of the press lever 61. The press lever 61 is a substantially U-shaped crank and has two opposite sides arranged symmetrically. The two first connecting portions 611, the two second connecting portions 612, and the two positioning holes 613 are formed on the two opposite sides of the press lever 61.

The two push members 63 are connected with the filter bottle assembly 40. Each of the two push members 63 has a first extension arm 631, a second extension arm 632, and two sliding tracks (or slides) 633. The first extension arm 631 and the second extension arm 632 are arranged symmetrically. Each of the two push members 63 has a top provided with a receiving portion 634 connecting the first extension arm 631 and the second extension arm 632. Each of the two push members 63 has a bottom provided with a slot 635 penetrating the first extension arm 631 and the second extension arm 632. Each of the two push members 63 is provided with a perforation 636 which is arranged on an upper end of the second extension arm 632. The two sliding tracks 633 of each of the two push members 63 are arranged symmetrically and are slidably mounted in the two slideways 214 of the filtering head 20.

Each of the two links 62 has a first end portion 621 provided with a first aperture 6211 pivotally connected with one of the two second connecting portions 612 of the press lever 61 by another one of the fastening members 80. Each of the two links 62 has a second end portion 622 provided with a second aperture 6221 pivotally connected with the perforation 636 of the second extension arm 632 of one of the two push members 63 and one of the two snap-fit members 64 by another one of the fastening members 80. Thus, each of the two links 62 connects the press lever 61 and one of the two push members 63, so that the press lever 61, the two links 62, and the two push members 63 are linked and moved in concert. The receiving portion 634 of each of the two push members 63 receives a bent connection of each of the two links 62 and the second end portion 622.

Each of the two snap-fit members 64 is pivotally connected with the second extension arm 632 of one of the two push members 63. Each of the two snap-fit members 64 is pivotally mounted in the slot 635 of one of the two push members 63. Each of the two snap-fit members 64 includes a pivot portion 641, a snap-fit portion 642, a torsion spring 645, and a driving portion 643. The driving portion 643 is connected with a push button 644. The pivot portion 641 and the torsion spring 645 are pivotally connected with the perforation 636 of one of the two push members 63. When the push button 644 of the driving portion 643 is pressed, each of the two snap-fit members 64 is pivoted about the pivot portion 641, and the torsion spring 645 provides a buffering and restoring function. The snap-fit portion 642 has a locking recess locked on one of the two positioning bolts 43, so that the two push members 63 are connected with the filter bottle 41 by the two snap-fit members 64.

In practice, the two first connecting portions 611 are served as a fulcrum of the press lever 61 so that the press lever 61 is pivoted upward and downward to move the two links 62 which move the two push members 63 which move the two snap-fit members 64 which move the filter bottle 41. In addition, when the two snap-fit members 64 are pivoted by pressing the push button 644, each of the two snap-fit members 64 is moved in the slot 635 of one of the two push members 63, the snap-fit portion 642 is locked on or detached from one of the two positioning bolts 43 so as to lock or unlock the filter bottle 41.

The quick release device 60 further includes a cover 65 mounted on the press lever 61 to cover and protect the press lever 61. The cover 65 includes an upper cover plate 651 and a lower cover plate 652. The press lever 61 has an upper end sandwiched between the upper cover plate 651 and the lower cover plate 652. The press lever 61 and the cover 65 protrude from the opening 71 of the filter cap 70. The opening 71 of the filter cap 70 restricts upward and downward movement of the press lever 61.

Figure 4:
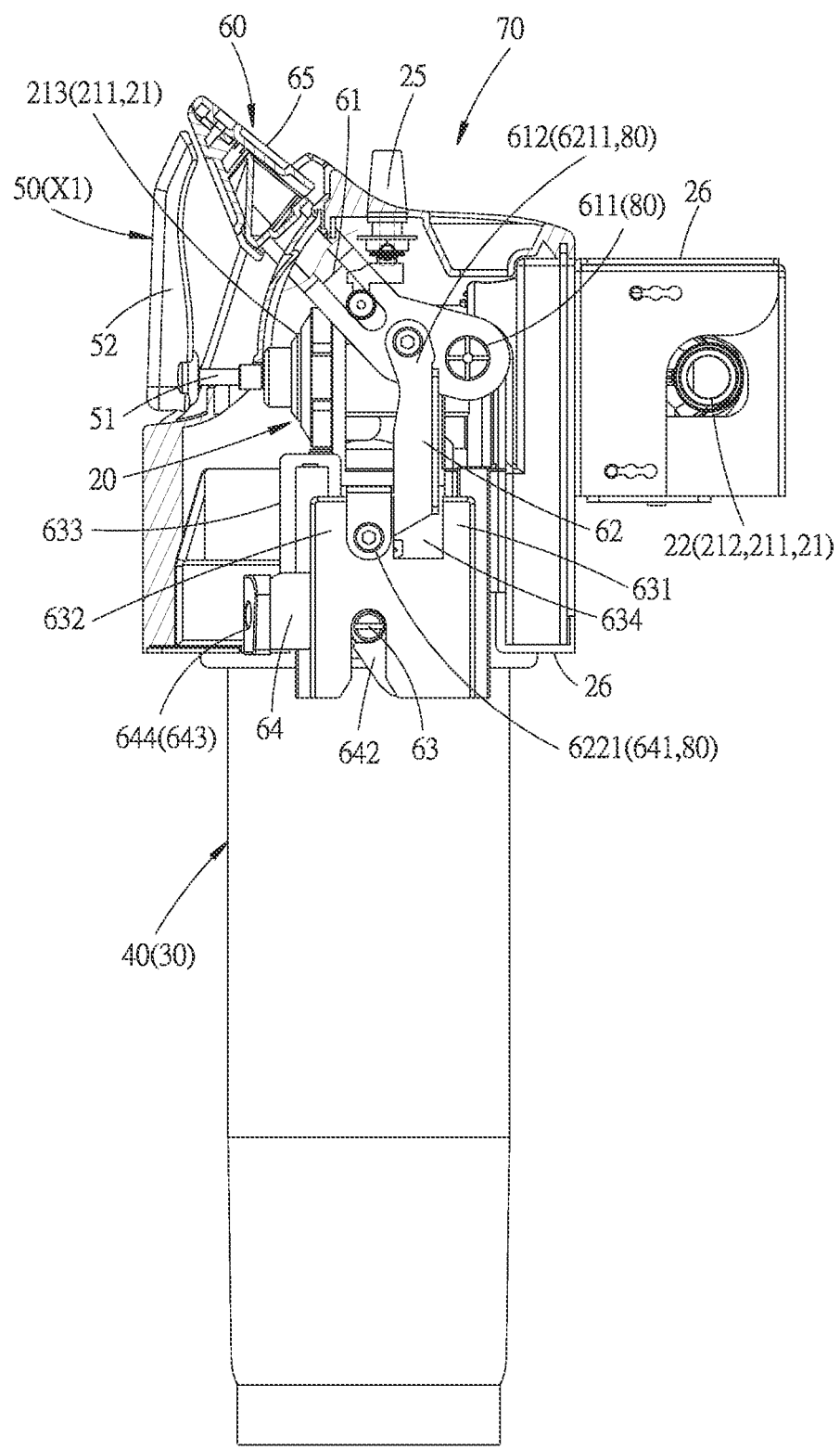
FIG. 4 is a side cross-sectional view of the water filter in accordance with the preferred embodiment of the present invention.
Figure 5:
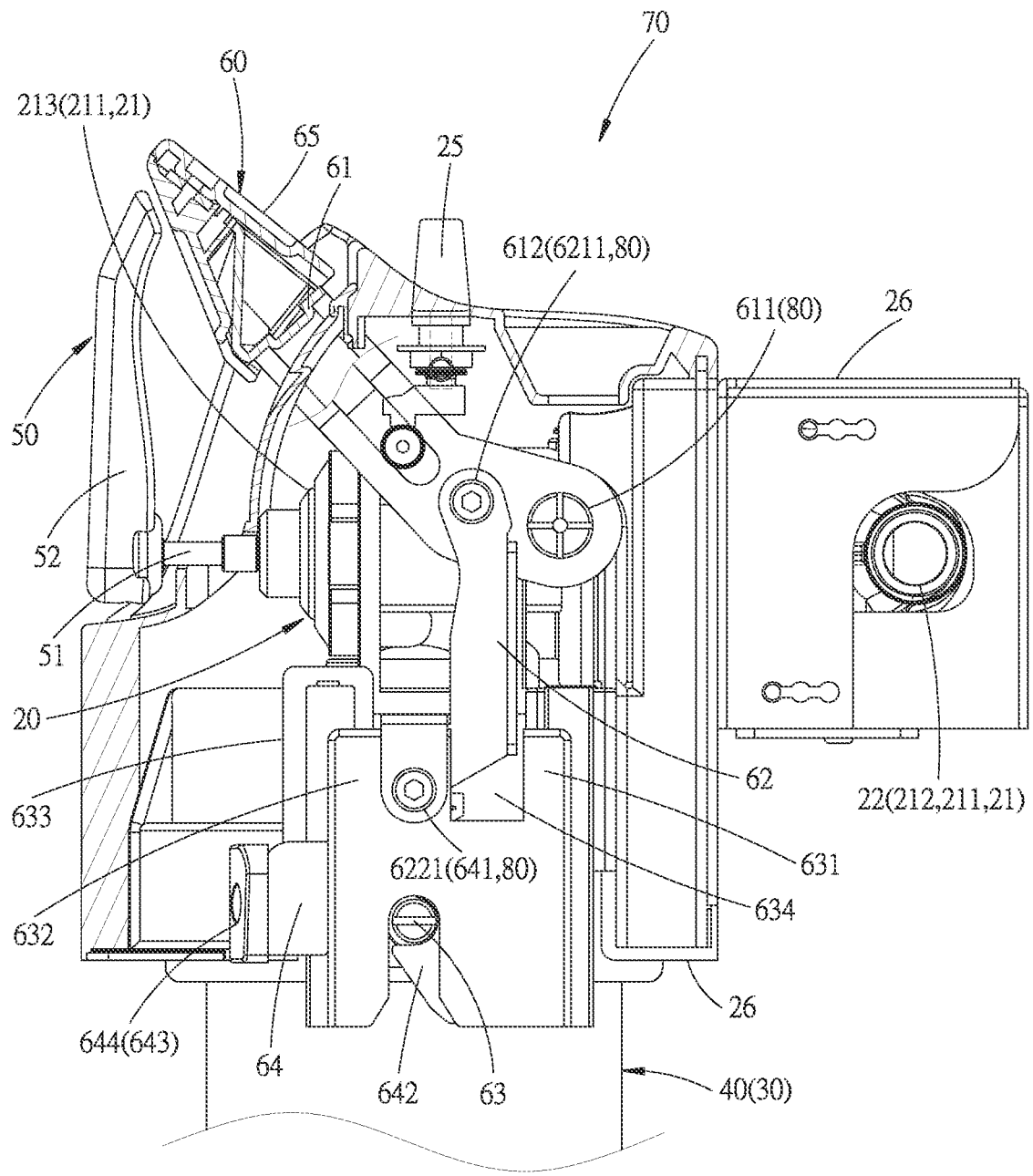
FIG. 5 is a locally enlarged view of the water filter as shown in FIG. 4.
Figure 6:
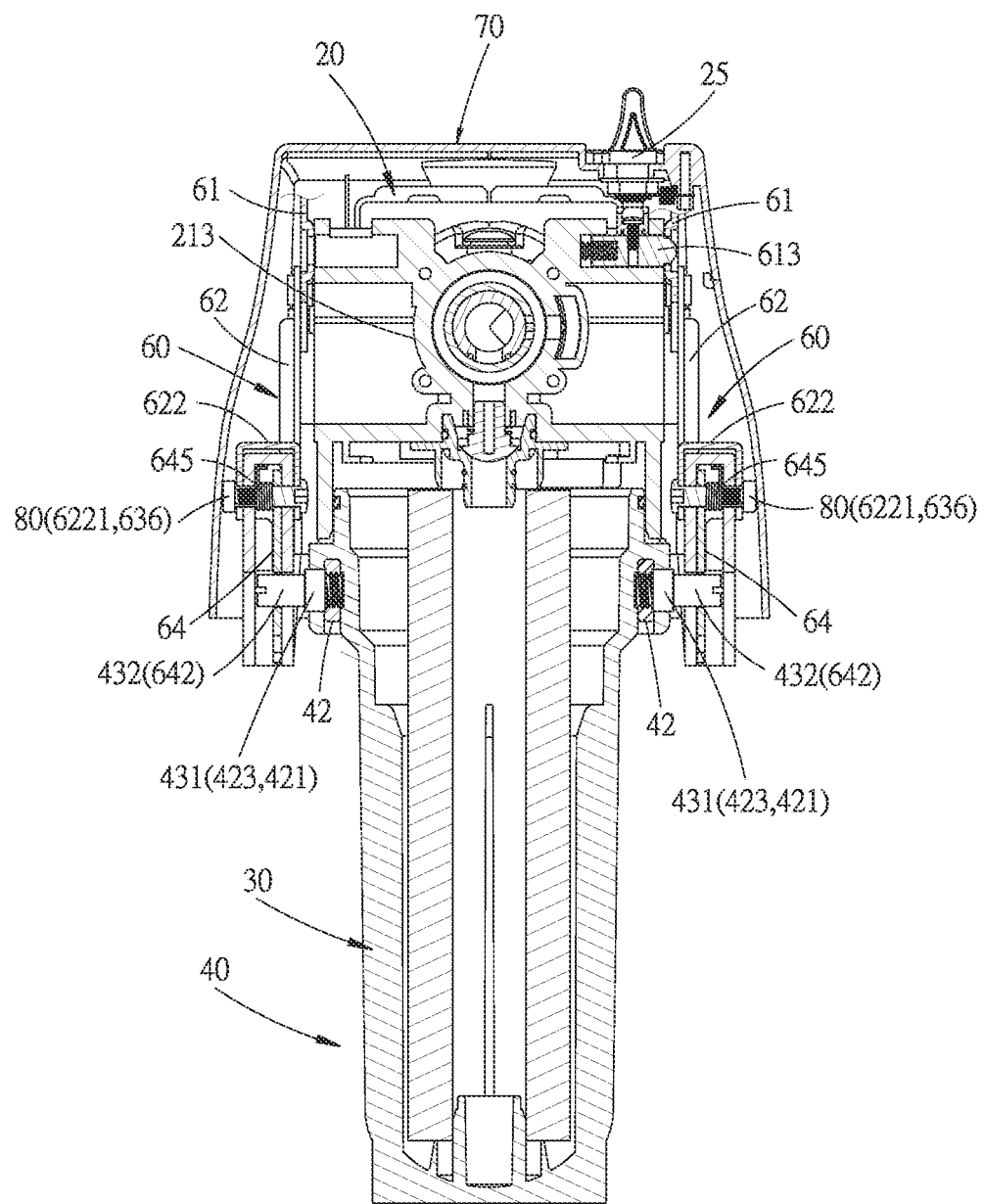
FIG. 6 is a front cross-sectional view of the water filter in accordance with the preferred embodiment of the present invention.
Figure 7:
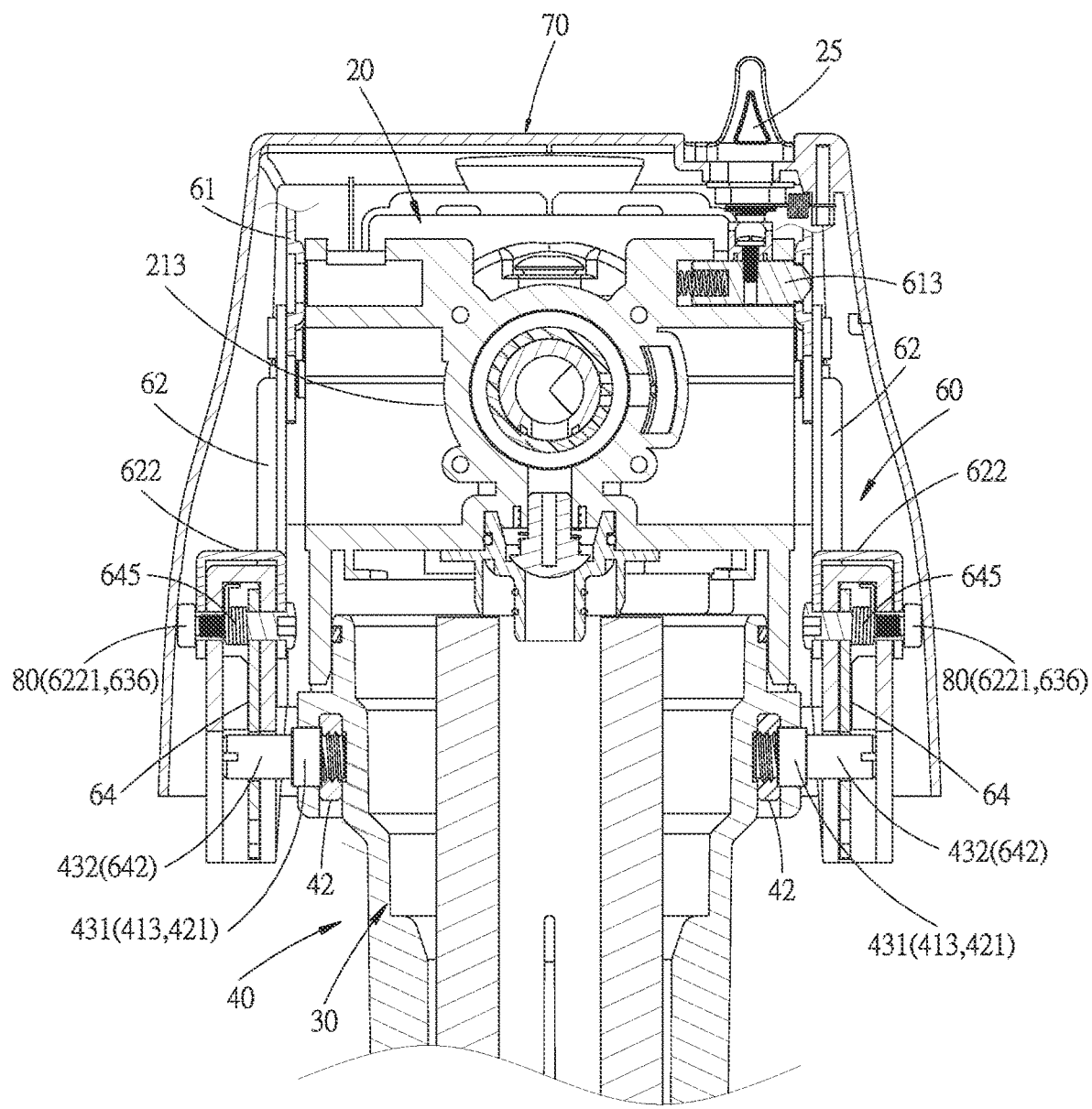
FIG. 7 is a locally enlarged view of the water filter as shown in FIG. 6.
Figure 8:
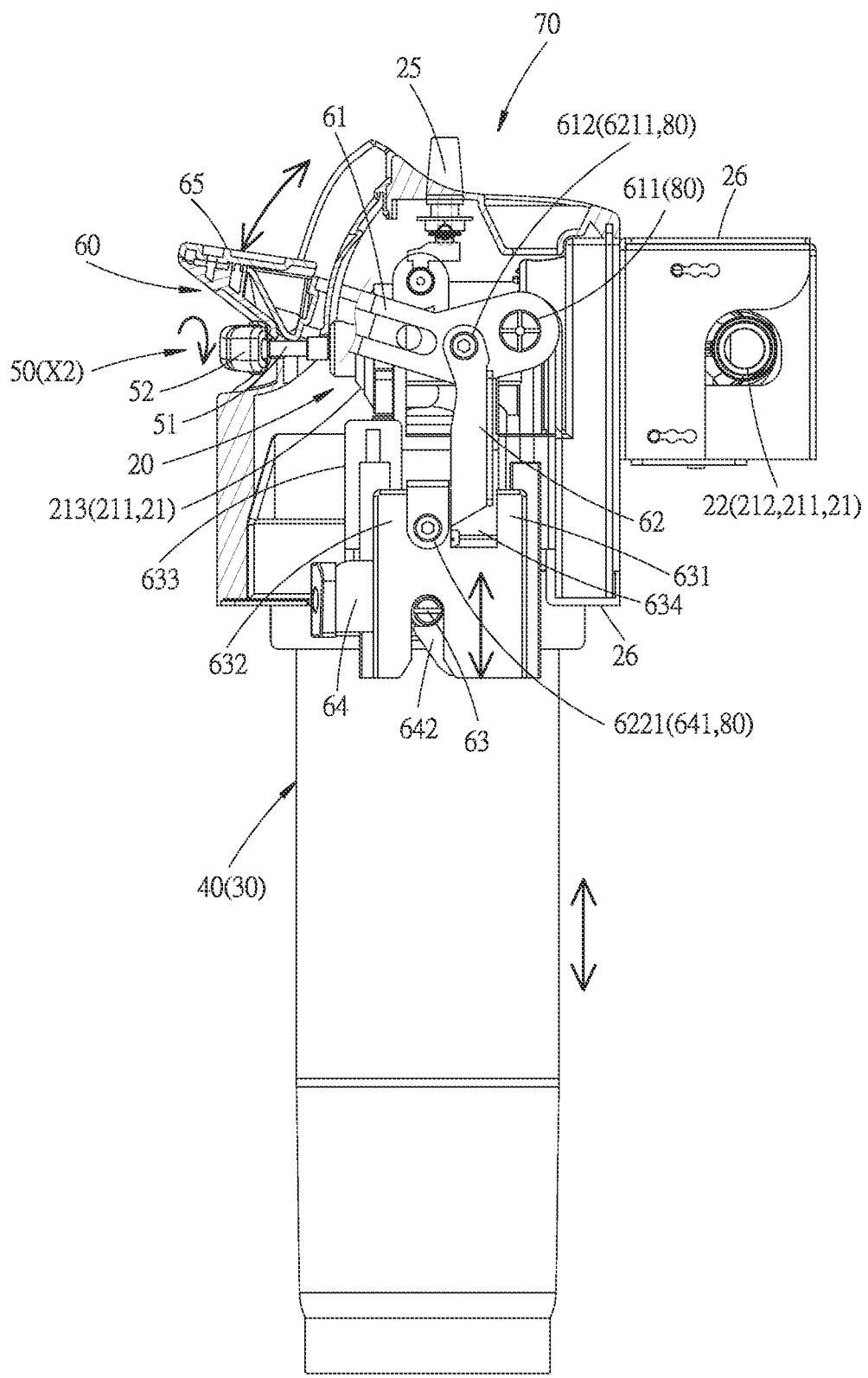
FIG. 8 is a schematic operational view of the water filter as shown in FIG. 4.
Figure 9:
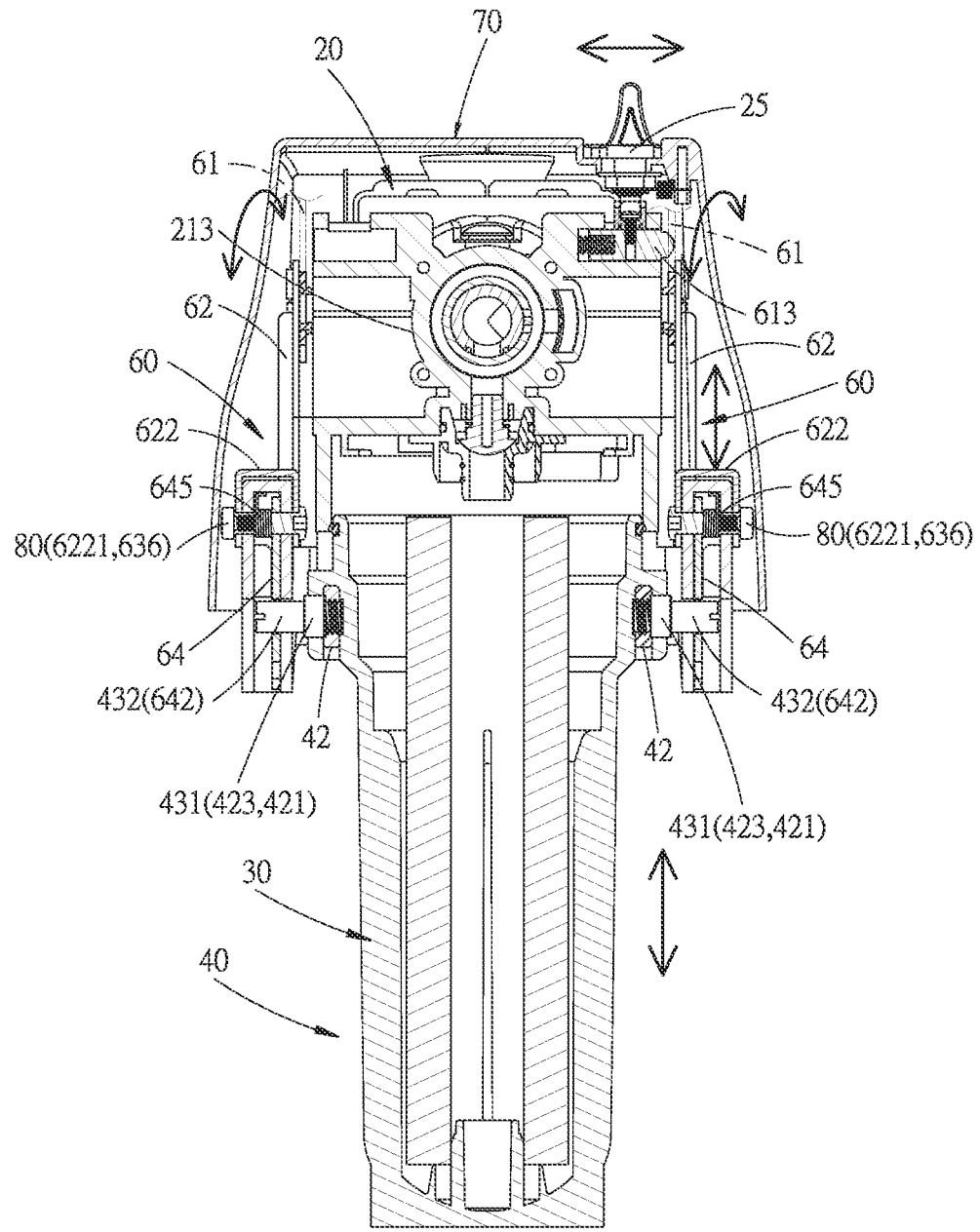
FIG. 9 is a schematic operational view of the water filter as shown in FIG. 6.

In operation, referring to FIGS. 8 and 9 with reference to FIGS. 1-7, when the switch member 50 is moved and switched from the first positioning angle X1 as shown in FIG. 4 to the second positioning angle X2 as shown in FIG. 8 (the switching action is indicated by the arrow), the waterway switch is turned off. At the same time, the water valve assembly 213 of the flow channel module 21 of the filtering head 20 is rotated by the control lever 51 of the switch member 50 so that the flow passage of the water valve assembly 213 is disconnected from the first flow channel 211, and the flow channel module 21 of the filtering head 20 is switched from the first flow path mode (or water purifying mode) to the second flow path mode (or replacement mode). At this time, the handle 52 of the switch member 50 is situated at a horizontal state, and the press lever 61 of the quick release device 60 is detached and unlocked from the handle 52 of the switch member 50 and can be moved freely. Then, the sliding button 25 is driven (indicated by the arrow as shown in FIG. 9) to push the spring-biased push block 27 which is moved to compresses the spring and is detached from one of the two positioning holes 613 of the press lever 61 so that the press lever 61 is unlocked and is moved freely. Then, the press lever 61 is pivoted about the two first connecting portions 611 (indicated by the arrow as shown in FIG. 8) and is pressed downward to move the two links 62 downward which move the two push members 63 downward which move the filter bottle 41 downward so that the filter bottle 41 is unlocked. When the push button 644 of the driving portion 643 of each of the two snap-fit members 64 is pressed, each of the two snap-fit members 64 is pivoted about the pivot portion 641, and the snap-fit portion 642 of each of the two snap-fit members 64 is moved in the slot 635 of one of the two push members 63 and detached from one of the two positioning bolts 43 to unlock the filter bottle 41 so that the filter bottle 41 is released from the quick release device 60 (indicated by the arrow as shown in FIGS. 8 and 9) and can be detached from the filtering head 20 to allow replacement of the filter element 30.

After replacement of the filter element 30, the filter bottle 41 is mounted on the filtering head 20 again, and the snap-fit portion 642 of each of the two snap-fit members 64 is pressed by the torsion spring 645 and is moved to lock one of the two positioning bolts 43 so as to lock the filter bottle 41 again. Then, the press lever 61 is pivoted about the two first connecting portions 611 and is pushed upward to move the two links 62 upward which move the two push members 63 upward which move the filter bottle 41 upward so that the first fitting portion 411 of the filter bottle 41 is assembled with the filtering head 20 again. Then, the press lever 61 is further pushed upward until the spring-biased push block 27 aligns with one of the two positioning holes 613 of the press lever 61. Then, the sliding button 25 is driven to push the spring-biased push block 27 which is also pressed by the spring and is inserted into one of the two positioning holes 613 of the press lever 61 so that the press lever 61 is locked. Finally, the switch member 50 is moved and switched to the first positioning angle X1 as shown in FIG. 4, and the handle 52 of the switch member 50 is situated at a vertical state and presses the press lever 61 as shown in FIG. 3 so that the press lever 61 is locked by the handle 52 of the switch member 50. Thus, the press lever 61 of the quick release device 60 is double locked by the spring-biased push block 27 and the handle 52 of the switch member 50. At this time, the waterway switch is turned on, the water valve assembly 213 of the flow channel module 21 of the filtering head 20 is rotated by the control lever 51 of the switch member 50 so that the flow passage of the water valve assembly 213 is connected to the first flow channel 211, and the flow channel module 21 of the filtering head 20 is disposed at the first flow path mode (or water purifying mode).

In conclusion, the press lever 61, the two links 62, and the two push members 63 of the quick release device 60 are moved in concert, and the two snap-fit members 64 are movably snapped onto the second fitting portion 412 of the filter bottle 41. When the press lever 61 is pivoted about the two first connecting portions 611, the two links 62, the two push members 63, and the two snap-fit members 64 are driven by the press lever 61 to move the filter bottle 41 simultaneously. When the press lever 61 is moved downward, the two links 62 and the two push members 63 are moved downward so that the filter bottle 41 is moved downward and is unlocked from the filtering head 20. When the press lever 61 is moved upward, the two links 62 and the two push members 63 are moved upward so that the filter bottle 41 is moved upward and is locked onto the filtering head 20.

It is appreciated that, when the press lever 61 of the quick release device 60 is moved upward and downward, the two links 62 and the two push members 63 are linked to drive the filter bottle 41 simultaneously which is moved upward and downward in a linear manner, so that the filter bottle 41 is detached and assembled easily and quickly by operation of the quick release device 60. Thus, the filter bottle 41 will not be detached accidentally during replacement of the filter element 30. In addition, the switch member 50 functions as a waterway switch control handle to switch the waterway of the flow channel module 21 of the filtering head 20 and also functions as a locking mechanism for locking the quick release device 60. Thus, the water supply is shut during replacement of the filter element 30 to prevent the water from leaking outward.

Accordingly, the quick release device 60 of the water filter 100 is operated easily and conveniently so that the filter bottle 41 is mounted on or detached from the filtering head 20 easily and quickly to facilitate the user replacing the filter element 30. In addition, the switch member 50 stops the water supply when the filter bottle 41 is detached from the filtering head 20 to construct a safety mechanism and to prevent the water from leaking outward during replacement of the filter element 30. Further, the switch member 50 functions as a waterway switch to control the waterway of the flow channel module 21 of the filtering head 20 and also functions as a locking mechanism for locking the quick release device 60. Further, the snap-fit portion 642 of each of the two snap-fit members 64 is hooked on one of the two positioning bolts 43 to keep the filter bottle 41, thereby preventing the filter bottle 41 from directly falling down after being released from the filtering head 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A water filter comprising:
a filtering head, a filter bottle assembly, and a quick release device;
wherein:
the filtering head includes a flow channel module;
the flow channel module includes a first flow channel, a second flow channel, and a water valve assembly;
the water valve assembly is arranged between the first flow channel and the second flow channel;
the filtering head has a lower end having two sides each provided with two opposite slideways;
the filter bottle assembly includes a filter bottle;
the filter bottle is removably connected with the filtering head and has a first fitting portion and a second fitting portion;
the quick release device includes a press lever, two links, two push members, and two snap-fit members;
the press lever is pivotally connected with the filtering head;
the press lever is provided with two first connecting portions, two second connecting portions, and two positioning holes;
the press lever has two opposite sides arranged symmetrically;
the two first connecting portions, the two second connecting portions, and the two positioning holes are formed on the two opposite sides of the press lever;
each of the two push members has a first extension arm, a second extension arm, and two sliding tracks;
each of the two push members has a top provided with a receiving portion connecting the first extension arm and the second extension arm;
each of the two push members has a bottom provided with a slot penetrating the first extension arm and the second extension arm;

the two sliding tracks of each of the two push members are slidably mounted in the two slideways of the filtering head;

each of the two snap-fit members is pivotally connected with the second extension arm of one of the two push members;

each of the two links has a first end portion pivotally connected with one of the two second connecting portions of the press lever;

each of the two links has a second end portion pivotally connected with the second extension arm of one of the two push members and connected with one of the two snap-fit members;

the press lever, the two links, and the two push members of the quick release device are moved in concert, and the two snap-fit members are movably snapped onto the second fitting portion of the filter bottle;

when the press lever is pivoted about the two first connecting portions, the two links, the two push members, and the two snap-fit members are driven by the press lever to move the filter bottle simultaneously;

when the press lever is moved downward, the two links and the two push members are moved downward so that the filter bottle is moved downward and is unlocked from the filtering head; and when the press lever is moved upward, the two links and the two push members are moved upward so that the filter bottle is moved upward and is locked onto the filtering head.

2. The water filter as claimed in claim 1, further comprising:

a filter cap mounted on the filtering head to cover the filtering head;

wherein:

the filter cap is hollow and has a front side provided with an opening;

the press lever protrudes from the opening of the filter cap; and the opening of the filter cap restricts movement of the press lever.

3. The water filter as claimed in claim 1, wherein the filtering head has an upper end provided with two opposite locking portions, and each of the two first connecting portions of the press lever is pivotally connected with one of the two locking portions of the filtering head.

4. The water filter as claimed in claim 1, further comprising:

a spring-biased push block movably mounted in the filtering head; and a sliding button movably mounted on an upper end of the filtering head and connected with the spring-biased push block;

wherein:

when the sliding button is moved on the filtering head, the spring-biased push block is driven by the sliding button and moved relative to the filtering head; and the spring-biased push block is locked in or detached from one of the two positioning holes of the press lever.

5. The water filter as claimed in claim 1, wherein:

the filter bottle assembly further includes a retaining ring, and two positioning bolts;

the retaining ring is mounted in the second fitting portion of the filter bottle; and each of the two positioning bolts is locked on the second fitting portion of the filter bottle.

6. The water filter as claimed in claim 5, wherein:

each of the two snap-fit members includes a pivot portion, a snap-fit portion, and a driving portion;

the pivot portion is pivotally connected with the second extension arm of one of the two push members; and the snap-fit portion has a locking recess locked on one of the two positioning bolts, so that the two push members are connected with the filter bottle.

7. The water filter as claimed in claim 6, wherein the driving portion is connected with a push button, and when the push button of the driving portion is pressed, each of the two snap-fit members is pivoted about the pivot portion and is moved in the slot of one of the two push members, so that the snap-fit portion is detached from one of the two positioning bolts to unlock the filter bottle.

8. The water filter as claimed in claim 1, further comprising:

a switch member having a first end provided with a control lever and a second end provided with a handle;

wherein:

the control lever of the switch member is connected with the water valve assembly of the flow channel module of the filtering head to rotate and control the water valve assembly; and the handle of the switch member is operated to control rotation of the switch member so that the switch member is moved between a first positioning angle and a second positioning angle.

9. The water filter as claimed in claim 8, wherein:

when the switch member is moved to the first positioning angle, the flow channel module of the filtering head is disposed at a first flow path mode (or water purifying mode), and the press lever of the quick release device is locked by the handle of the switch member; and when the switch member is moved to the second positioning angle, the flow channel module of the filtering head is disposed at a second flow path mode (or replacement mode), and the press lever of the quick release device is unlocked from the handle of the switch member.

10. The water filter as claimed in claim 1, wherein the quick release device further includes a cover mounted on the press lever to cover the press lever.

* * * * *